(12) United States Patent
Shin et al.

(10) Patent No.: US 10,871,858 B2
(45) Date of Patent: Dec. 22, 2020

(54) DISPLAY PANEL INCLUDING PHOTOSENSOR UNIT AND DISPLAY DEVICE USING SAME

(71) Applicant: LG Display Co., Ltd., Seoul (KR)

(72) Inventors: SeungHwan Shin, Jeonju-si (KR); Soyoung Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/103,246

(22) Filed: Aug. 14, 2018

(65) Prior Publication Data

US 2019/0056839 A1    Feb. 21, 2019

(30) Foreign Application Priority Data

Aug. 16, 2017   (KR) .................. 10-2017-0103703

(51) Int. Cl.
  *G06F 3/038* (2013.01)
  *G06F 3/042* (2006.01)
  *G06F 3/041* (2006.01)

(52) U.S. Cl.
  CPC .......... *G06F 3/0421* (2013.01); *G06F 3/0412* (2013.01); *G06F 3/0416* (2013.01)

(58) Field of Classification Search
  None
  See application file for complete search history.

(56) References Cited

U.S. PATENT DOCUMENTS

| 2009/0289912 A1* | 11/2009 | Chen ..................... G06F 3/0412 345/173 |
| 2011/0157116 A1* | 6/2011 | Shiraki ................ G09G 3/3648 345/207 |
| 2012/0056252 A1* | 3/2012 | Aoki ................. H01L 27/14641 257/292 |
| 2012/0112047 A1* | 5/2012 | Brown ................ G02F 1/13318 250/214.1 |
| 2015/0302793 A1* | 10/2015 | In ............................. G09G 5/18 345/211 |

* cited by examiner

*Primary Examiner* — Carl Adams
(74) *Attorney, Agent, or Firm* — Seed Intellectual Property Law Group LLP

(57) ABSTRACT

An embodiment disclosed herein provides a display device including: a display panel including a driving signal line, a sensing signal line, a data line extending in a first direction and configured to apply a data signal to a pixel, and a photosensor circuit controllable by a first power signal and configured to output a sensing signal to the sensing signal line according to a driving signal received through the driving signal line; a sensing-driving circuit configured to output the driving signal supplied through the driving signal line and to detect the sensing signal from the sensing signal line; and a power supply unit configured to supply the first power signal, wherein the data line is disposed in a region where the photosensor circuit is disposed.

19 Claims, 8 Drawing Sheets

DISPLAY PANEL INCLUDING PHOTOSENSOR UNIT AND DISPLAY DEVICE USING SAME

CROSS REFERENCE TO RELATED APPLICATION

This application claims priority from Korean Patent Application No. 10-2017-0103703, filed on Aug. 16, 2017, which is hereby incorporated by reference for all purposes as if fully set forth herein.

BACKGROUND

Technical Field

Embodiments disclosed herein relate to a display panel including a photosensor unit, and a display device using the display panel.

Description of the Related Art

As society has advanced to an information-oriented society, demand for display devices of various types has increased, and various types of display devices, such as a Liquid Crystal Display (LCD) device, a plasma display device, and an Organic Light-Emitting Diode (OLED) display device, have come to be utilized.

A display device may operate by receiving a user's command input through various input devices such as a keyboard or a mouse, and input devices, which enable a user's command to be intuitively and conveniently input by touching a screen of a display device, have been developed. For this purpose, a touch panel may be disposed on a screen of a display device, and may be configured to receive a user's command when a user inputs the user's command by touching the screen of the display device while viewing the screen of the display device. However, the touch panel positioned on the display device may make the display device thick and heavy and may degrade the brightness thereof, thereby making the display device poor in visibility. Recently, the display device tends to be made thinner and lighter for aesthetic reasons or in order to be easy to carry.

Therefore, in order to realize a thin display device due to the above-described problems and recent trends, there has been proposed a method of mounting a touch electrode on a display device through an additional process in the course of manufacturing the display device, rather than disposing a touch panel on the display device. When elements for sensing various kinds of input are mounted on the display panel, the aperture ratio of the display device is lowered.

BRIEF SUMMARY

In various embodiments, the present disclosure provides a display panel including a photosensor unit capable of improving image quality by increasing an aperture ratio.

In various embodiments, the present disclosure provides a display panel and a display device which enable a slim design despite the fact that a photosensor unit is incorporated therein.

In one or more embodiments, the present disclosure provides a display device including: a display panel including a driving signal line, a sensing signal line, a data line extending in a first direction and configured to apply a data signal to a pixel, and a photosensor circuit controllable by a first power signal and configured to output a sensing signal to a sensing signal line according to a driving signal received through the driving signal line; a sensing-driving circuit configured to output the driving signal received through the driving signal line and to detect the sensing signal from the sensing signal line; and a power supply unit configured to supply first power signal. The data line is disposed in a region where the photosensor circuit is disposed.

In another embodiment, the present disclosure provides a display panel including a plurality of pixels arranged in rows and columns. The plurality of pixels including a first pixel in a first row and a first column, a second pixel in a second row and a second column, a third pixel in the first row and a third column, and a fourth pixel in the second row and a fourth column. The display panel further includes: a first data line extending in a first direction and configured to supply a data signal to the first pixel and the second pixel; a second data line extending in the first direction and disposed in parallel with the first data line and configured to supply a data signal to the third pixel and the fourth pixel; a driving signal line disposed between the first data line and the second data line and extending in the first direction; a sensing signal line extending in the first direction, the second data line being disposed between the driving signal line and the sensing signal line; and a photosensor circuit connected to the driving signal line and the sensing signal line and disposed between the first row and the second row. The second data line is disposed in a region where the photosensor circuit is disposed.

According to embodiments disclosed herein, it is possible to provide a display panel including a photosensor unit capable of improving image quality by increasing an aperture ratio.

According to embodiments disclosed herein, it is possible to provide a display panel and a display device which enable a slim design despite the fact that a photosensor unit is incorporated therein.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
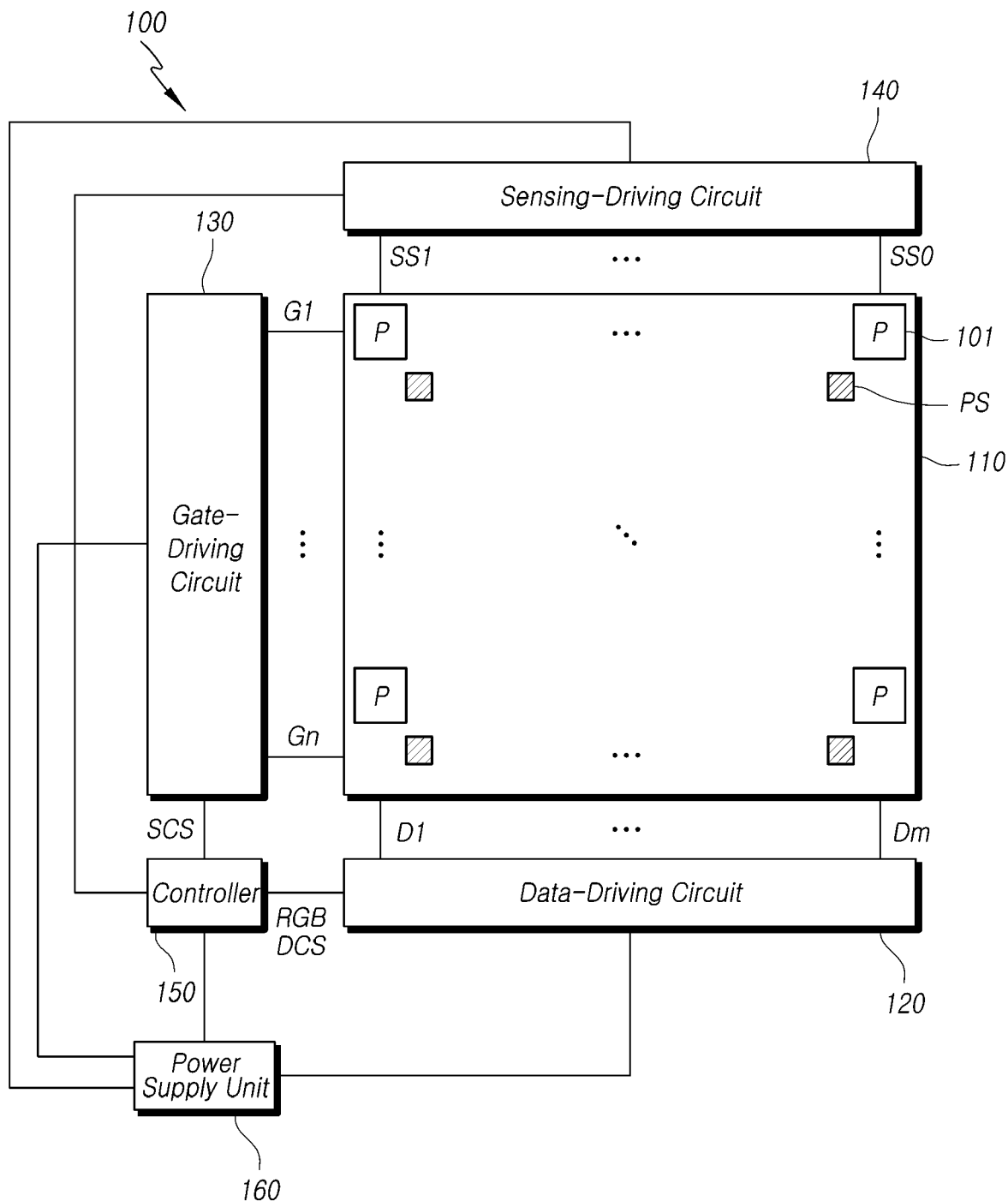
FIG. 1 is a structural diagram illustrating a display device according to embodiments disclosed herein.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a structural diagram illustrating a display device according to embodiments disclosed herein.

Referring to FIG. 1, a display device 100 may include a display panel 110, a data-driving circuit 120, a gate-driving circuit 130, a sensing-driving circuit 140, and a controller 150.

The display panel 110 may have a plurality of data lines D1 to Dm and a plurality of gate lines G1 to Gn, which intersect each other. The term "intersect" is used herein to mean that one element crosses over or overlaps another element, and does not necessarily mean that the two elements contact each other. For example, the data lines D1 to Dm and the gate lines G1 to Gn may intersect each other, but may be physically separated from one another, for example, by one or more layers or elements provided therebetween. The display panel 110 may have pixels 101 corresponding to regions where the data lines D1 to Dm and the gate lines G1 to Gn intersect each other. The display panel 110 may display an image corresponding to a data signal and a gate signal transmitted through the data lines D1 to Dm and the gate lines G1 to Gn.

In addition, the display panel 110 may include one or more photosensor circuits PS (which may be referred to hereinafter as a photosensor unit PS). The photosensor unit PS may sense light and may generate a sensing signal including positional information indicating a position where the light is projected in response to the sensed light. For example, when light is projected onto one point on the display panel 110 using a device such as a laser pointer, a sensing signal including information indicative of the projected position of the light may be output.

In addition, the display panel 110 may include sensing lines SS1 to SSO configured to drive the photosensor unit PS. The sensing lines SS1 to SSO may include a sensing-driving line configured to apply a sensing-driving signal to the photosensor unit PS and a sensing signal line configured to transmit a sensing signal transmitted from the photosensor unit PS to the sensing-driving circuit 140. However, the present disclosure is not limited thereto.

Since the photosensor unit PS is mounted or embedded in the display panel 110, the display panel 110 may be implemented to be thinner than the display panel 110 having the photosensor unit PS disposed on the display panel 110.

The data-driving circuit 120 is connected to the data lines D1 to Dm so as to supply data signals to the data lines D1 to Dm. Although one data-driving circuit 120 is illustrated, the present disclosure is not limited thereto, and the number of data-driving circuits 120 may be determined depending on the size and resolution of the display panel 110. In addition, the data-driving circuit 120 may be implemented with a driver IC. In addition, the data-driving circuit 120 may be connected to the display panel 110 via a flexible printed circuit board (FPCB).

The gate-driving circuit 130 may be connected to the plurality of gate lines G1 to Gn so as to supply gate signals to the gate lines G1 to Gn. The gate-driving circuit 130 is illustrated as being disposed on one side of the display panel 110, but is not limited thereto. Gate-driving circuits 130 may be disposed on the opposite sides of the display panel 110, so that the gate-driving circuit 130 disposed on one side of the display panel 110 may drive odd-numbered gate lines and the gate-driving circuit 130 disposed on the other side of the display panel 110 may drive even-numbered gate lines. In addition, the gate-driving circuit 110 may include a Gate-In-Panel (GIP) circuit. Of a display region and a non-display region formed on the display panel 110, the GIP circuit may be formed in the non-display region (not illustrated). The GIP circuit may be formed during the formation of pixels 101 on the display panel 110. The gate-driving circuit 130 may be implemented with a driver IC.

The sensing-driving circuit 140 may transmit a sensing-driving signal to the photosensor unit PS and may receive a sensing signal transmitted from the photosensor unit PS. Here, the sensing-driving circuit 140 is described as being a single driving circuit, but it is not limited thereto. The sensing-driving circuit 140 may also be implemented with a driver IC. The photosensor unit PS may generate signals including position information in response to irradiated light. That is, when a user irradiates a region of the display panel 110 using a device for irradiating light such as a laser pointer, the photosensor unit PS may detect the light and may transmit a sensing signal including position information on the irradiated position to the sensing-driving circuit 140.

The controller 150 may control the data-driving circuit 120, the gate-driving circuit 130, and the sensing-driving circuit 140. The controller 150 may supply an image signal RGB to the data driving circuit 120, so that the data-driving unit 120 may generate a data signal. In addition, the controller 150 may receive a sensing signal transmitted from the sensing-driving circuit 140 and may calculate the position of the radiated light using the position information included in the sensing signal. Here, the controller 150 may include a first controller (not illustrated) configured to control the data-driving circuit 120 and the gate-driving circuit 130 and a second controller (not illustrated) configured to control the sensing-driving circuit 140. The controller 150 may be or include processing circuitry (such as a microcontroller, processor, or the like) configured to calculate the position of the radiated light based on the signals generated by the photosensor unit PS and the sensing signal received from the sensing-driving circuit 140.

The display panel 110 implemented as described above may display an image, and may sense radiated light and may calculate position information based on the irradiated position.

In addition, the display device 100 may further include a power supply unit 160. The power supply unit 160 may supply power to the display panel 110, the data-driving circuit 120, the gate-driving circuit 130, the sensing-driving circuit 140, the controller 150, and the like. The power supply unit 160 may receive a driving voltage transmitted from an external device and may generate and supply a voltage used for the display panel 110, the data-driving circuit 120, the gate-driving circuit 130, the sensing-driving circuit 140, and the controller 150.

Figure 2:
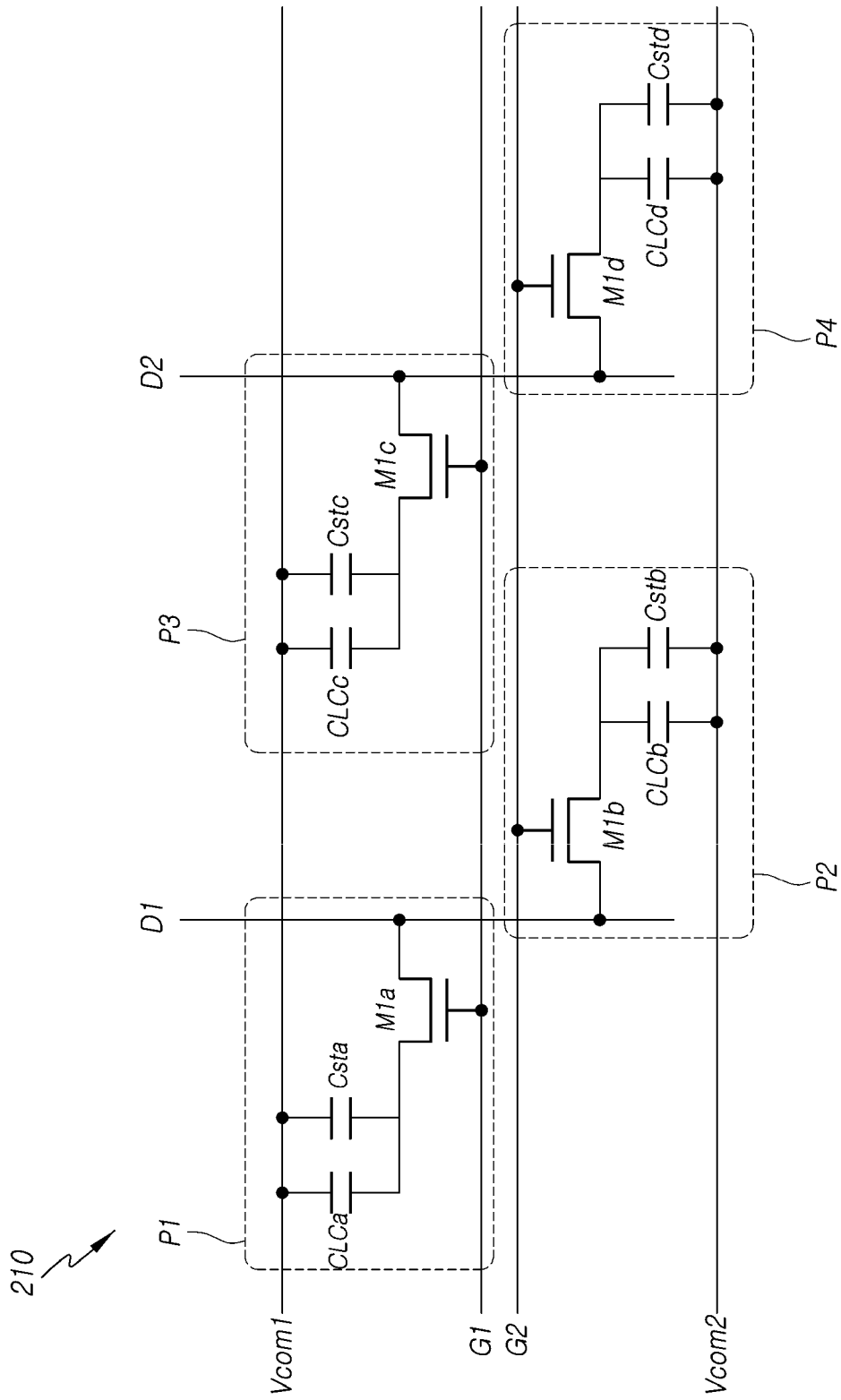
FIG. 2 is a circuit diagram illustrating a display device according to embodiments disclosed herein.

FIG. 2 is a circuit diagram illustrating a display device according to embodiments disclosed herein.

Referring to FIG. 2, a plurality of pixels may be arranged in a plurality of rows and columns on a display panel 210. For the convenience of explanation, an arrangement of four adjacent pixels, among the plurality of pixels arranged on the display panel, is illustrated.

A first pixel P1 may be disposed in a region where, among the plurality of pixel rows and pixel columns, the first row and the first column intersect each other, a second pixel P2 may be disposed in a region where a second row and a second column intersect each other, a third pixel P3 may be disposed in a region where the first row and the second column intersect each other, and a fourth pixel P4 may be disposed in a region where the second row and the second column intersect each other. The first pixel P1 may include a driving transistor M1a connected to a gate line G1 and receiving a data signal transmitted from the data line D1 in response to the gate signal, a storage capacitor Csta configured to store a data signal, and a liquid crystal CLCa (which may be a liquid crystal cell or a portion of a liquid crystal layer, which may be referred to herein as a "liquid crystal") connected in parallel with the storage capacitor Csta. The second to fourth pixels P2 to P4 may have the same structure as the first pixel P1.

In addition, the first pixel P1 and the second pixel P2 may receive a data signal supplied from the first data line D1, and the third pixel P3 and the fourth pixel P4 may receive a data signal supplied from the second data line D2.

In addition, the first pixel P1 and the third pixel P3 may receive a gate signal supplied from the first gate line G1, and the second pixel P2 and the fourth pixel P4 may receive a gate signal supplied from the second gate line G2. The first gate line G1 and the second gate line G2 may be disposed adjacent to each other so as to be disposed in a space between the first pixel P1 and the third pixel P3 and a space between the second pixel P2 and the fourth pixel P4.

The first to fourth pixels P1 to P4 may be disposed between a first common power line Vcom1, configured to supply a common power to the first pixel P1 and the third pixel P3, and a second common power line Vcom2, configured to supply a common power to the second pixel P2 and the fourth pixel P4. The first common power line Vcom1 and the second common power line Vcom2 may be supplied from the power supply unit 160 illustrated in FIG. 1.

In the manner in which the first to fourth pixels P1 to P4 are arranged on the display panel 210 as described above, when two columns of pixels are arranged to be connected in one data line D1 or another data line D2, it is possible to reduce the number of pixel columns arranged in the display panel 210 by half. Therefore, in the display panel 210 in which a plurality of pixels are arranged in the m×n form, the number of data lines can be reduced to m/2. When the number of data lines is reduced, the number of wirings arranged on the display panel 210 can be reduced, and thus the aperture ratio of the display panel 210 can be improved.

Figure 3:
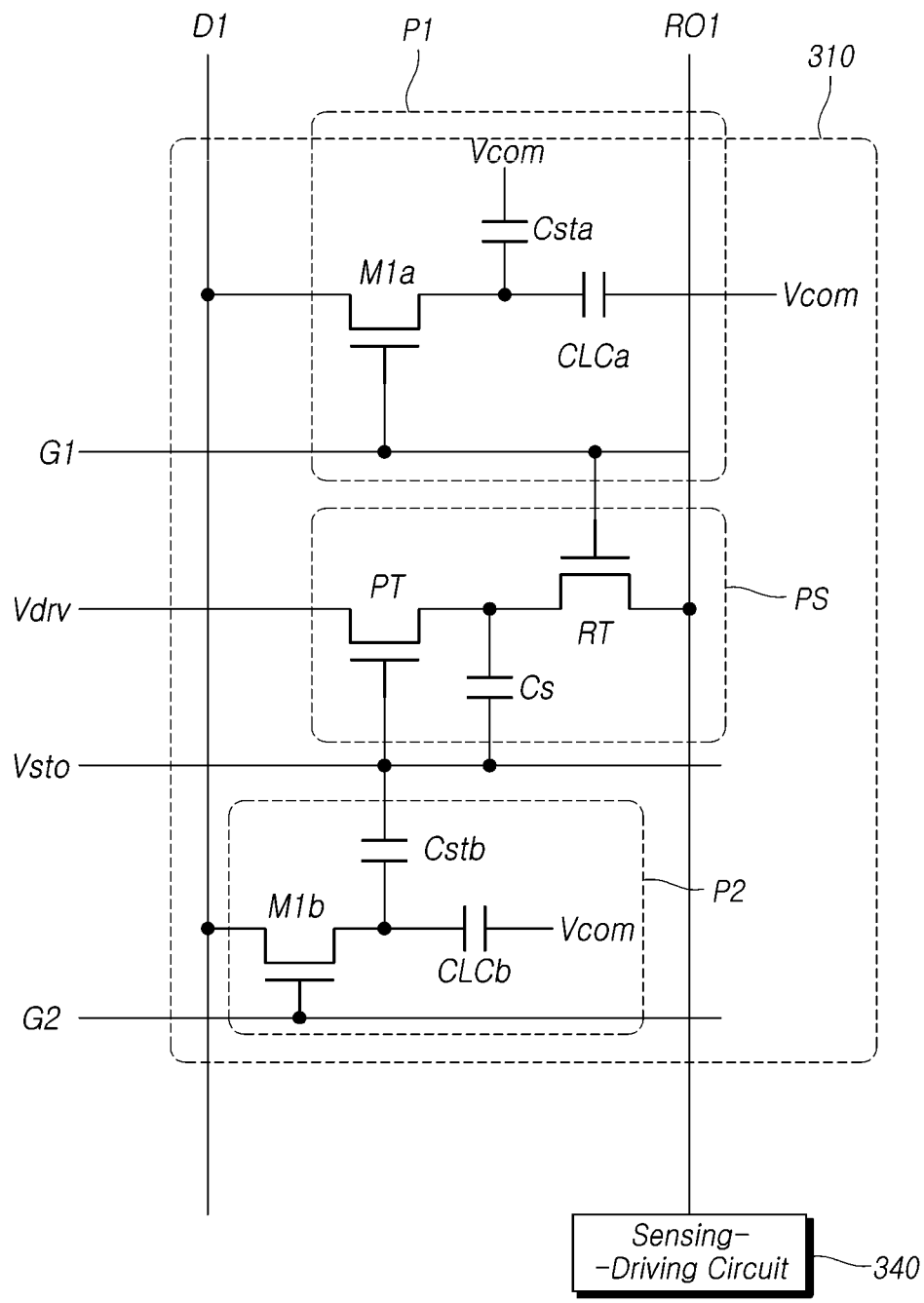
FIG. 3 is a circuit diagram illustrating a display device according to embodiments disclosed herein.

FIG. 3 is a circuit diagram illustrating a display device according to embodiments disclosed herein.

Referring to FIG. 3, a connection relationship between pixels disposed on a display panel and a photosensor unit is illustrated.

The photosensor unit PS may be disposed between a first pixel P1 and a second pixel P2 in a display panel 310. In the first pixel P1, a first electrode of a driving transistor M1a may be connected to a data line D1, and a liquid crystal CLCa and a storage capacitor Csta may be connected to a second electrode. In addition, a gate line G1 may be connected to a gate electrode of the driving transistor M1a. The liquid crystal CLCa and the storage capacitor Csta may be connected in parallel such that one side thereof is connected to the driving transistor M1a and the other side is connected to a common power line Vcom. In addition, in the second pixel P2, the first electrode of the driving transistor M1a may be connected to the data line D1, and a liquid crystal CLCb and a storage capacitor Cstb may be connected to a second electrode. In addition, a gate line G2 may be connected to a gate electrode of a driving transistor M1b. The liquid crystal CLCb and the storage capacitor Cstb may be connected in parallel such that one side thereof is connected to the driving transistor M1b and the other side is connected to the common power line Vcom.

The photosensor unit PS may include a first transistor PT configured to sense light, a second transistor RT configured to be selectively turned ON/OFF so as to transmit a voltage corresponding to the current generated by the first transistor PT to a sensing-driving circuit, and a first capacitor Cs configured to store a voltage corresponding to the current generated by the first transistor PT. The first transistor PT may be any suitable transistor capable of sensing light, and may be, for example, any phototransistor. In addition, the first transistor PT may have a first electrode connected to the sensing-driving line Vdry and a second electrode connected to the first capacitor Cs. In addition, the second transistor RT may have a first electrode connected to a sensing signal line RO1 and a second electrode connected to the first capacitor Cs. In addition, the gate electrode of the second transistor RT may be connected to a first gate line G1. However, embodiments of the present disclosure are not limited thereto, and the gate electrode of the second transistor RT may receive a gate signal supplied through a separate gate line. When the gate electrode of the second transistor RT is connected to the first gate line G1 and receives a gate signal, the number of horizontal wirings can be reduced so as to increase the aperture ratio, since the second transistor RT does not include a dedicated and separate line connected to its gate. Also, the sensing signal line RO1 may be connected to the sensing-driving circuit 340 so as to receive a sensing signal.

When the pixels and the photosensor units PS are disposed on the display panel 310, the aperture ratio is lowered by the photosensor unit PS, the driving signal line Vdry configured to transmit a driving signal to the photosensor units PS, and by the sensing-driving line RO1 configured to transmit a sensing signal. When the photosensor unit PS is disposed between some pixels, the pixels between which the photosensor unit PS is disposed and the pixels between which no photosensor unit PS is disposed are different in the size of light-emitting regions and this difference is visible with eyes, and thus the image quality may deteriorate. That is, photosensor units PS may be disposed between some adjacent pixels (e.g., between pixels P1 and P2 as shown in FIG. 3), while other adjacent pixels may not have a photosensor unit PS disposed therebetween, which may result in the pixels having different sizes of light-emitting regions.

Here, the supplied first power Vsto and the common power may be supplied from the power supply unit 160 illustrated in FIG. 1.

Figure 4A:
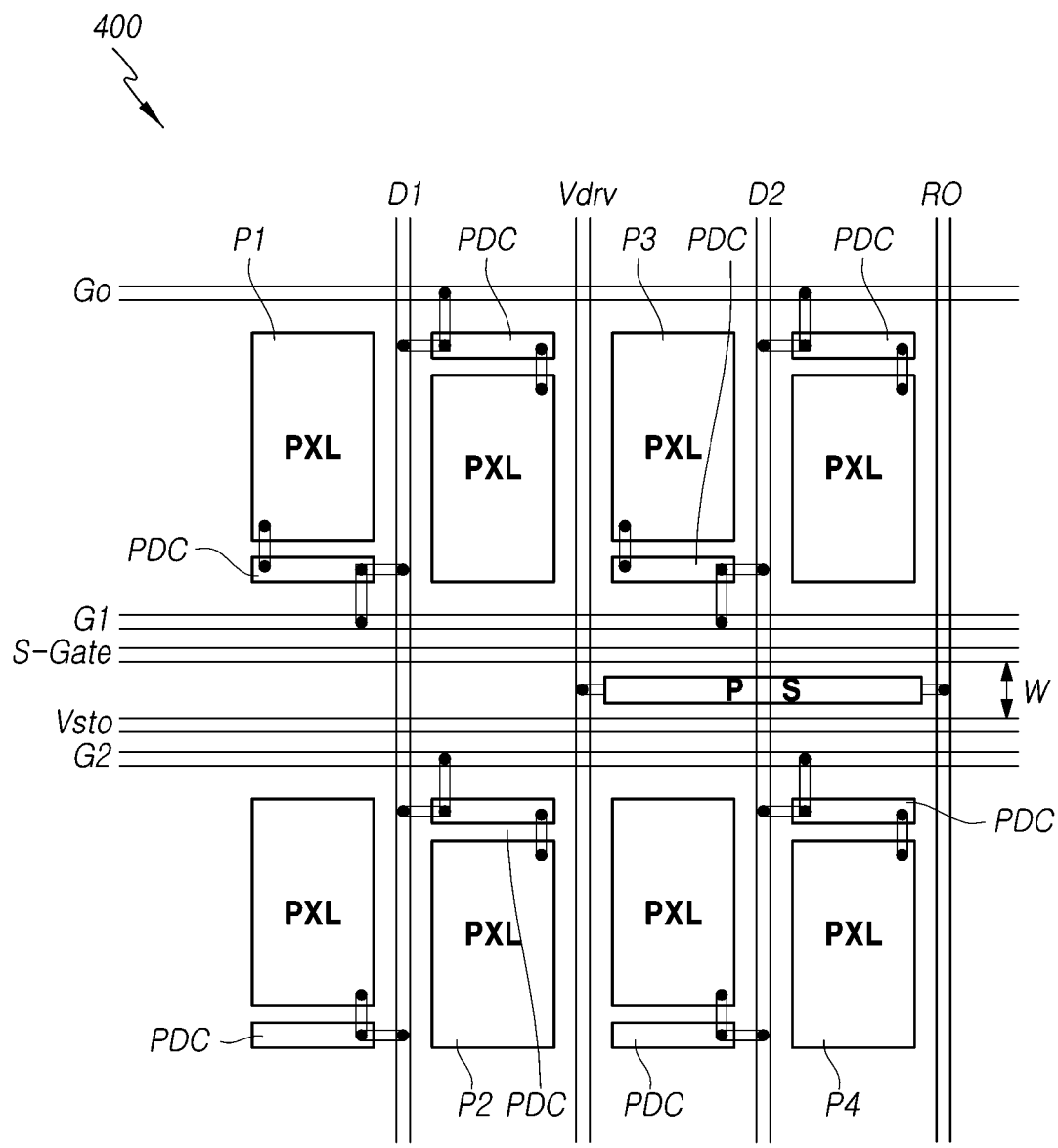
FIG. 4A is a conceptual diagram illustrating a display device according to embodiments disclosed herein.
Figure 4B:
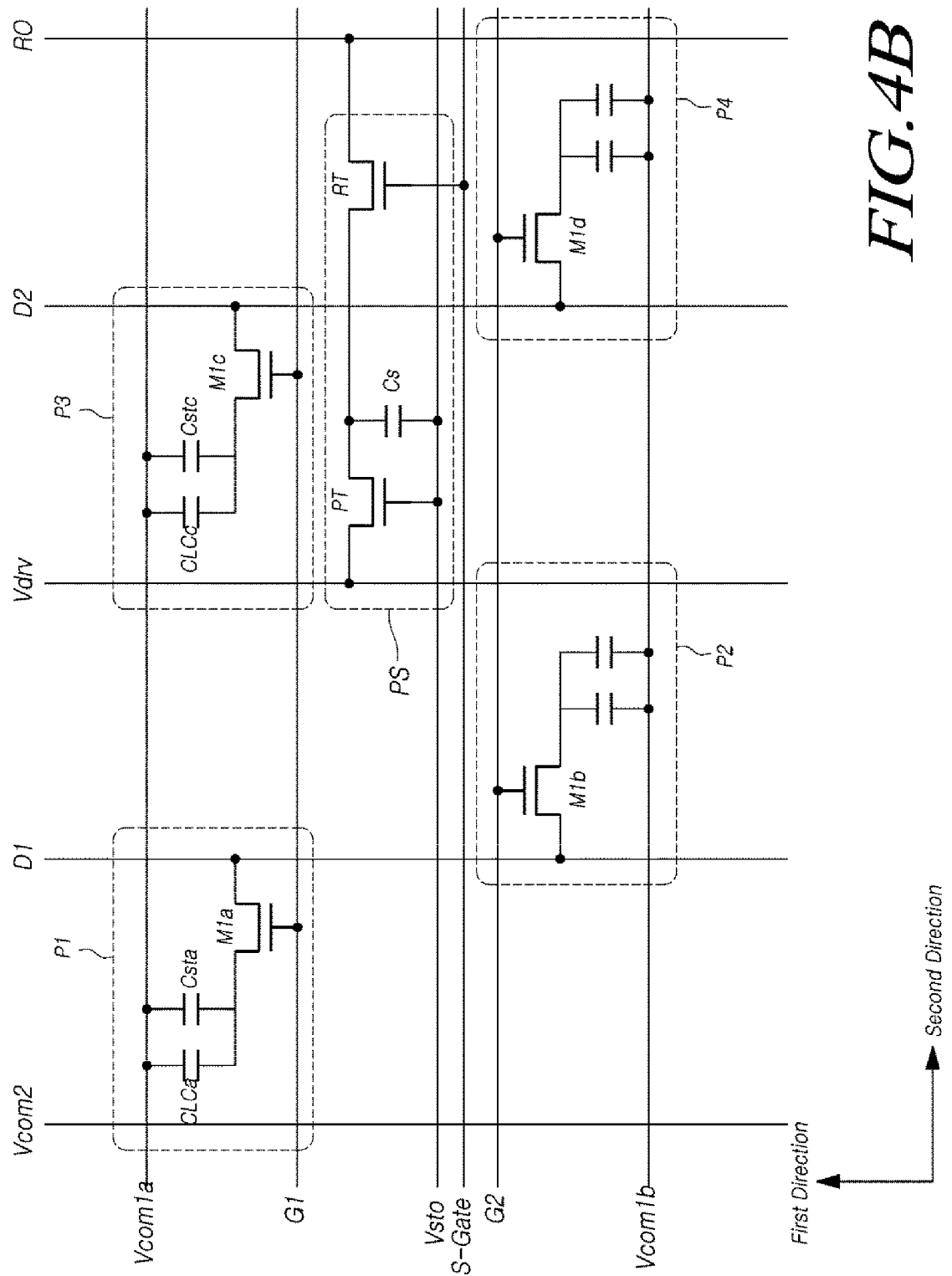
FIG. 4B is a circuit diagram illustrating a display device according to embodiments disclosed herein.

FIG. 4A is a conceptual diagram illustrating a display device according to embodiments disclosed herein, and FIG. 4B is a circuit diagram illustrating a display device according to embodiments disclosed herein.

Referring to FIG. 4A, a display device 400 may include a first data line D1 extending in a first direction and a second data line D2 disposed at a predetermined interval from the first data line D1. The display device 400 may further include a sensing-driving line Vdrv extending in the first direction between the first data line D1 and the second data line D2 and a sensing signal line RO arranged in parallel with the sensing-driving line Vdrv. The second data line D2 may be disposed between the sensing-driving line Vdry and the sensing signal line RO.

The display device 400 may further include a first gate line G1 extending in a second direction and a second gate line G2 disposed in parallel with the first gate line G1. In addition, the display device may include a first common power line Vcom1a (FIG. 4B) disposed in parallel with the first gate line G1 at a predetermined interval from the first gate line G1 and a second common power line Vcom1b (FIG. 4B) disposed in parallel with the second gate line G2 and at a predetermined interval from the second gate line G2. A first pixel P1 and a third pixel P3 are disposed between the first common power line Vcom1a and the first gate line G1, and a second pixel P2 and a fourth pixel P4 may be disposed between the second common power line Vcom1b and the second gate line G2. Therefore, a sensing-driving line Vdry and a sensing signal line RO may not be included in the wirings extending in the second direction. A photosensor unit PS may be disposed between the first gate line G1 and the second gate line G2.

In addition, each pixel may include a pixel driving circuit PDC connected to the gate line and the data line, and a light-emitting region PXL configured to emit light to correspond to a data signal transmitted through the data line. The light-emitting region PXL may include a pixel electrode, a common electrode, and a liquid crystal disposed between the pixel electrode and the common electrode.

The display device 400 may have a plurality of pixels arranged in the m×n form, in which a first pixel P1 is arranged to correspond to the first row and the first column, a second pixel P2 is arranged to correspond to the second row and the second column, a third pixel P3 may be arranged to correspond to the first row and the third column, and a fourth pixel P4 may be arranged to correspond to the second row and the fourth column. Thus, two pixels arranged in different columns are connected to one data line, so that the number of data lines can be reduced to m/2.

As shown in FIG. 4B, the first pixel P1 may include a driving transistor M1a having a first electrode connected to the data line D1, a second electrode connected to the liquid crystal CLCa and the storage capacitor Csta, and a gate electrode connected to the first gate line G1. The liquid crystal CLCa and the storage capacitor Csta may be connected in parallel such that one side thereof is connected to the driving transistor M1a and the other side is connected to a common power line Vcom1a. The liquid crystal CLCa may correspond to the light-emitting area of FIG. 4A, and the driving transistor M1a and the storage capacitor Csta may correspond to the pixel-driving circuit PDC of FIG. 4A.

A sensing gate line S-gate configured to apply a gate signal to the photosensor unit PS and a first voltage line Vsto configured to supply a first voltage to the photosensor unit PS may be disposed between the first gate line G1 and the second gate line G2.

The photosensor unit PS may include a first transistor PT configured to receive a sensing-driving signal through a driving signal line Vdry and to sense light, a capacitor Cs, a charge amount of which varies in response to a signal sensed from the first transistor PT, and a second transistor RT configured to transmit the charge amount stored in the capacitor Cs to the sensing signal line RO. The gate electrode of the transistor PT and the first electrode of the first capacitor Cs may be connected to the first power line Vsto. The first power line Vsto may supply a voltage lower than the threshold voltage of the first transistor PT. The first voltage may be −5V. However, the present disclosure is not limited thereto. The first voltage supplied through the first power line Vsto may be maintained for a predetermined time, so that the first transistor PT can be maintained in the OFF state.

When light is radiated, the first transistor PT may be turned on and a driving signal transmitted through the sensing-driving line Vdry may be transmitted to the capacitor Cs, so that a predetermined voltage may be stored in the capacitor Cs. The second transistor RT may be turned on by receiving a gate signal through the sensing gate line S-gate and is turned on. When the second transistor RT is turned on, the voltage stored in the capacitor Cs may be output to the sensing signal line RO, and may be transmitted to the sensing-driving circuit through the sensing signal line. The sensing-driving circuit may generate a sensing signal corresponding to the magnitude of the voltage transmitted through the sensing signal line and may transmit the sensing signal to the controller. Here, the second transistor RT may operate by receiving a second gate signal transmitted through the second gate line G2. When the second transistor RT operates by receiving the second gate signal, the sensing gate line S-gate is not required. That is, in some embodiments, the gate of the second transistor RT of the photosensor unit PS may be connected to one of the gate lines (e.g., the second gate line G2) instead of having a separate sensing gate line S-gate for controlling the second transistor RT. Thus, the aperture ratio of the display panel can be improved.

The photosensor unit PS may have the first transistor PT and the second transistor RT disposed on opposite sides of a data line, for example, the first transistor PT and the second transistor RT are disposed on opposite sides of the second data line D2 as shown in FIG. 4B. That is, the photosensor unit PS is divisionally disposed between the lower portion of the driving circuit of the third pixel P3 and the upper portion of the driving circuit of the fourth pixel P4, and a wiring connecting the first transistor PT and the second transistor RT may overlap the second data line D2. The second data line D2 may be disposed in a region where the photosensor unit PS is disposed.

Since the photosensor unit PS is disposed to overlap the second data line D2, the width of the interval W between the first and second pixels P1 and P2 and the third and fourth pixels P3 and P4 can be reduced. Therefore, it is possible to reduce the deviation in size between the light-emitting regions PXL of the first and second pixels P1 and P2 and the light-emitting regions PXL of the third and fourth pixels P3 and P4, thereby preventing image quality from deteriorating.

In addition, each of the driving signal line Vdry and the sensing signal line RO, which apply a sensing-driving signal to the photosensor unit PS, extends in the first direction so as not to be disposed between the first and second pixels P1 and P2 and the third and fourth pixels P3 and P4, so that the width of the interval W can be reduced. In addition, the display panel 210 in which pixels are arranged in the m×n form may reduce the number of data lines m/2, and driving signal lines Vdry and sensing signal lines RO may be arranged by the reduced number of data lines, so that the aperture ratio of the display device may not be lowered.

When the photosensor unit PS is built into the display panel, a gate electrode or the like is used without forming a separate electrode layer. Thus, even if the photosensor unit PS is built into the display panel, the thickness of the display panel may not be further increased. Since the display device 400 may also include a vertical common power line Vcom2 arranged in parallel with the first data line D1 and orthogonal to the first common power line Vcom1a and the second common power line Vcom1b, the common power applied to the pixels can be supplied more stably. The first voltage supplied through the first power line Vsto and the common power may be supplied from the power supply unit 160 illustrated in FIG. 1.

Figure 5:
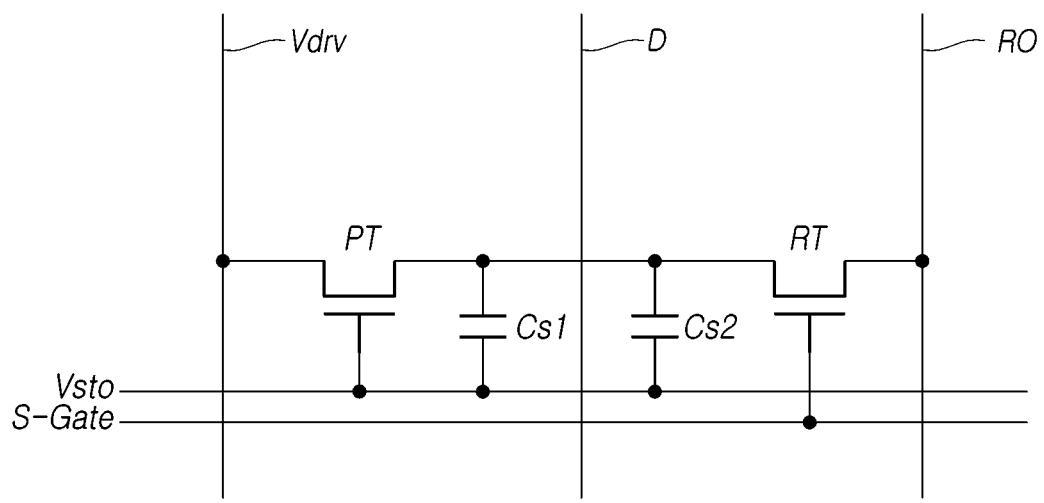
FIG. 5 is a circuit diagram illustrating an embodiment of a photosensor unit in a display device according to embodiments disclosed herein.

FIG. 5 is a circuit diagram illustrating an embodiment of a photosensor unit PS in a display device according to embodiments disclosed herein.

Referring to FIG. 5, the area of the capacitor may have the largest influence on the area occupied by the photosensor unit. Therefore, the width of the interval W between the first gate line G1 and the second gate line G2 can be further reduced by dividing the capacitor Cs into a first capacitor Cs1 and a second capacitor Cs2 connected in parallel, disposing the first capacitor Cs1 and the first transistor PT between the driving signal line Vdry and the data line D, and disposing the second capacitor Cs2 and the second transistor RT between the data line D and the sensing signal line RO.

Figure 6:
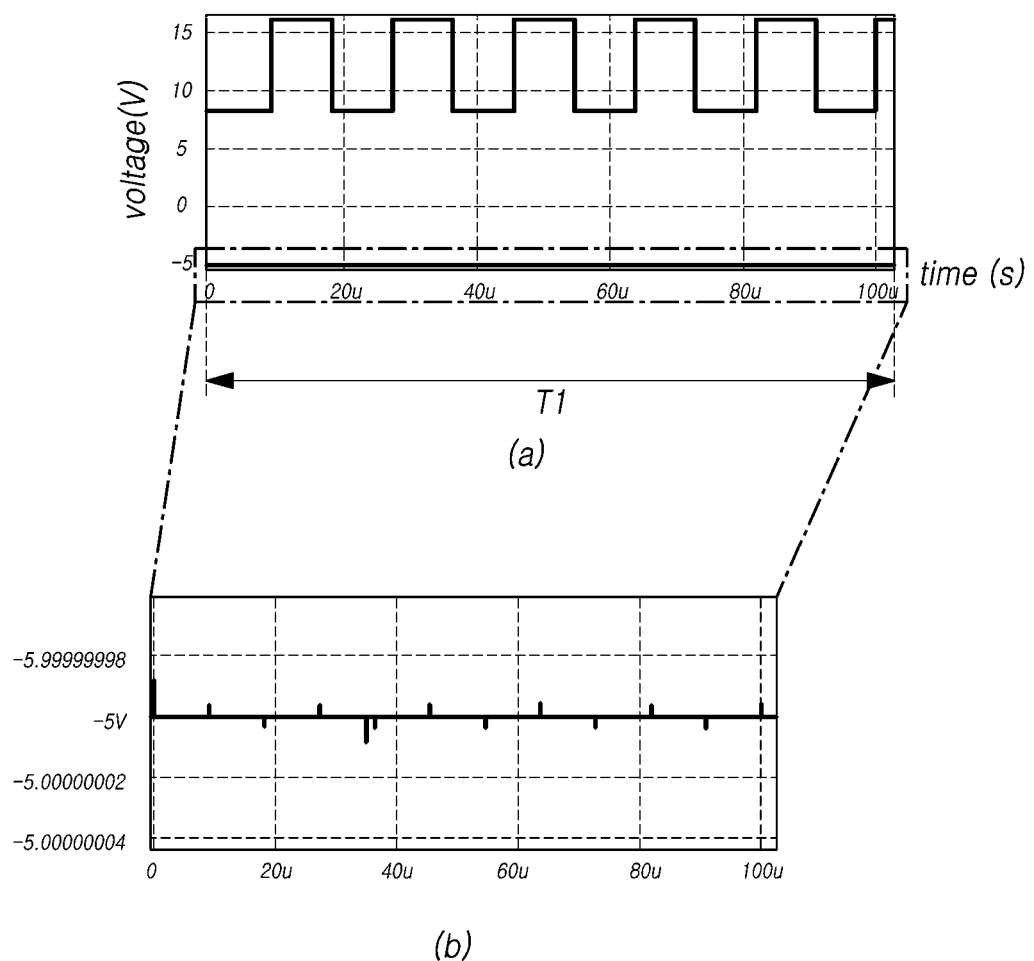
FIG. 6 is a graph illustrating the sensitivity of a photosensor unit with respect to a data signal transmitted through a data line in a display device according to embodiments disclosed herein.

FIG. 6 is a graph illustrating the sensitivity of a photosensor unit with respect to a data signal transmitted through a data line in a display device according to embodiments disclosed herein.

Referring to FIG. 6, an upper portion "a" is a graph illustrating voltage variation in a data signal transmitted through a data line and voltage variation of a capacitor, and a lower portion "b" is a graph illustrating voltage variation of the capacitor in a section T1 in the graph "a" in an enlarged scale.

In order to verify the sensitivity, the data line was made to represent a voltage between about 8V and 15V, and the first power source of the capacitor was made to maintain a voltage of −5V. It can be seen that even though the data voltage varies between about 8V and 15, the voltage of the first power source varies instantaneously in an extremely low amount, but returns nearly instantaneously to a voltage level of −5V again. Therefore, it can be seen that even if the voltage of the data signal varies, the voltage variation of the capacitor is not large and thus the sensitivity is low.

Therefore, even if a photosensor unit overlaps a data line, a sensing signal sensed by the photosensor unit is not distorted by the voltage of a data signal transmitted through the data line, so that the photosensor portion and the data line can be arranged to overlap each other.

Figure 7:
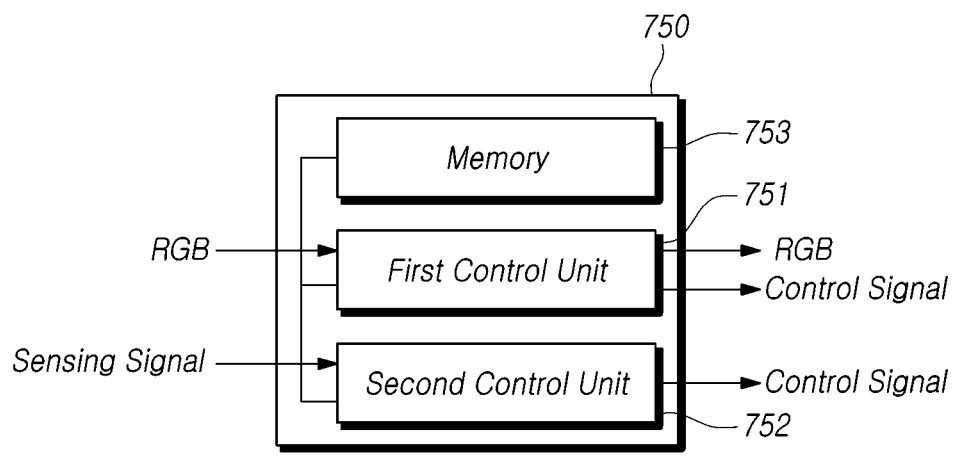
FIG. 7 is a structural diagram illustrating of an embodiment of a controller employed in a display device according to embodiments disclosed herein.

FIG. 7 is a structural diagram illustrating of an embodiment of a controller employed in a display device according to present embodiments disclosed herein.

Referring to FIG. 7, a controller 750 may include a first controller 751 (which may be referred to as a first control unit 751) configured to control a data-driving circuit and a gate-driving circuit, and a second controller 752 (which may be referred to as a second control unit 752) configured to control a sensing-driving circuit.

The first control unit 751 may supply a control signal and an image signal RGB to the data-driving circuit such that the data-driving circuit can output a data signal. In addition, the first control unit 751 may supply a control signal to the gate driving circuit such that a gate signal can be output. The first control unit 751 may store an image signal on a frame-by-frame basis and may supply the image signal for each line. Thus, the first controller 751 may include a frame memory to store the image signal.

The second control unit 752 may control the sensing-driving circuit so as to output a sensing-driving signal in the sensing-driving circuit and may receive a sensing signal so as to calculate position information. The second control unit 752 may include a frame memory configured to store position information included in the sensing signal received from the sensing-driving circuit, and may use the position information stored in the frame memory so as to allow the position information to be used in various applications.

In order to use the frame memory described above, the controller 750 may include a memory 753 and may divisionally store the image signal and the position information in a first frame memory and a second frame memory of the memory 753, respectively.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
   a display panel including:
      a driving signal line;
      a sensing signal line;
      a data line extending in a first direction and configured to apply a data signal to a pixel;
      a gate line extending in a second direction; and
      a photosensor circuit including a first transistor electrically connected to the driving signal line and configured to receive a driving signal from the driving signal line and to sense light, the photosensor circuit controllable by a first power signal and configured to output a sensing signal to the sensing signal line according to the driving signal received through the driving signal line;
   a sensing-driving circuit configured to output the driving signal to the driving signal line and to detect the sensing signal from the sensing signal line;
   a power supply unit configured to supply the first power signal; and
   a sensing gate line configured to provide a gate signal to the photosensor circuit, the sensing gate line overlapping with the data line, wherein the data line is disposed in a region where the photosensor circuit is disposed, wherein both the driving signal line, which is electrically connected to the first transistor and which provides the driving signal to the first transistor, and the sensing signal line are extended in the first direction and are overlapped with the gate line.

2. The display device of claim 1, wherein the photosensor circuit further includes:
a first capacitor configured to store a charge corresponding to the driving signal in response to light being sensed by the first transistor; and
a second transistor configured to transmit the charge stored in the first capacitor to the sensing line.

3. The display device of claim 2, wherein the photosensor circuit further includes:
a second capacitor connected in parallel with the first capacitor,
wherein the data line is disposed between the first capacitor and the second capacitor.

4. The display device of claim 3, wherein the first transistor and the first capacitor are disposed between the driving signal line and the data line, and the second transistor and the second capacitor are disposed between the data line and the sensing signal line.

5. The display device of claim 2, further comprising:
a common power line disposed in parallel with the gate line and configured to supply a common power to the pixel; and
a first power line disposed in parallel with the gate line and configured to apply the first power signal to a gate electrode of the first transistor and the first capacitor,
wherein the gate line is configured to supply a gate signal to the pixel, and the second direction is transverse to the first direction.

6. The display device of claim 1, wherein the data line and the photosensor circuit at least partially overlap one another.

7. A display panel comprising:
a plurality of pixels arranged in rows and columns, the plurality of pixels including:
a first pixel disposed in a first row and a first column,
a second pixel disposed in a second row and a second column,
a third pixel disposed in the first row and a third column, and
a fourth pixel disposed in the second row and a fourth column;
a first data line extending in a first direction and configured to supply a data signal to the first pixel and the second pixel;
a second data line extending in the first direction, disposed in parallel with the first data line, and configured to supply a data signal to the third pixel and the fourth pixel;
a driving signal line disposed between the first data line and the second data line and extending in the first direction in which the first data line extends;
a sensing signal line extending in the first direction in which the first data line extends, the second data line being disposed between the driving signal line and the sensing signal line;
a gate line extending in a second direction;
a photosensor circuit including a first transistor connected to the driving signal line and configured to receive a driving signal from the driving signal line and to sense light, the photo sensor circuit connected to the sensing signal line and disposed between the first row and the second row; and
a sensing gate line configured to provide a gate signal to the photosensor circuit, the sensing gate line overlapping with at least one of the first data line or the second data line,
wherein the second data line is disposed in a region where the photosensor circuit is disposed,
wherein both the driving signal line which is electrically connected to the first transistor and which provides the driving signal to the first transistor, and the sensing signal line are extended in the first direction and are overlapped with the gate line.

8. The display panel of claim 7, wherein the first pixel and the third pixel are connected to a first gate line extending in the second direction that is transverse to the first direction, and the second pixel and the fourth pixel are connected to a second gate line which is disposed in parallel with the first gate line.

9. The display panel of claim 8, wherein the photosensor circuit is disposed between the first gate line and the second gate line.

10. The display panel of claim 9, wherein the photosensor circuit further includes:
a first capacitor configured to store a charge which varies to correspond to light sensed by the first transistor; and
a second transistor configured to transmit the charge stored in the first capacitor to the sensing line.

11. The display panel of claim 10, further comprising:
a first power line disposed between the first gate line and the second gate line and configured to apply a first voltage to a gate electrode of the first transistor and the first capacitor.

12. The display panel of claim 11, further comprising:
a second capacitor connected in parallel with the first capacitor.

13. The display panel of claim 12, wherein the second capacitor is included in the photosensor circuit.

14. The display panel of claim 12, wherein the first transistor and the first capacitor are disposed between the driving signal line and the second data line, and the second transistor and the second capacitor are disposed between the second data line and the sensing signal line.

15. The display panel of claim 12, wherein the second transistor is connected to the second gate line.

16. The display panel of claim 8, further comprising:
a first common power line extending in the second direction and configured to supply common power to the first pixel and the third pixel; and
a second common power line disposed in parallel with the first common power line and configured to supply common power to the second pixel and the fourth pixel,
wherein the first gate line and the second gate line are disposed between the first common power line and the second common power line.

17. The display panel of claim 16, further comprising:
a first vertical common power line disposed in parallel with the first data line, wherein the first data line is disposed between the first vertical common power line and the first driving signal line.

18. The display panel of claim 7, wherein the second data line and the photosensor circuit at least partially overlap one another.

19. The display panel of claim 7 wherein the photosensor circuit is disposed between the first and second rows and extends between the third and fourth columns.

\* \* \* \* \*